Patented Sept. 23, 1924.

1,509,605

UNITED STATES PATENT OFFICE.

RALPH H. McKEE, OF NEW YORK, N. Y.

PROCESS OF MAKING ALUMINUM CHLORIDE.

No Drawing.  Application filed October 5, 1923. Serial No. 666,854.

*To all whom it may concern:*

Be it known that I, RALPH H. McKEE, a citizen of the United States, residing at New York, in the county of New York and State of New York, have invented certain new and useful Improvements in Processes of Making Aluminum Chloride, of which the following is a specification.

This invention relates to processes of making aluminum chloride and more particularly to the use of activated carbons in the manufacture of aluminum chloride from clay, bauxite, or other aluminum bearing materials and chlorine.

At the present time, aluminum chloride is formed by treating metallic aluminum with chlorine or hydrochloric acid gas. Generally, in the manufacture of this material in commercial quantities, naturally occurring aluminum compounds, such as clay and bauxite, are treated with chlorine or hydrochloric acid gas at elevated temperatures to form aluminum chloride. Those bauxites which are low in iron are best suited for the purpose, but unfortunately such materials are high in silica and silica containing native aluminum ores and compounds. In the treatment of these ores, they are dried and ground with coke or other forms of carbon and then treated at a high temperature with chlorine gas. The aluminum chloride sublimes out and is collected for use in the industries. It has been found, however, that in the presence of carbon, chlorine not only reacts on the aluminum or aluminum oxide but also on silica with the resultant formation of silicon chloride. In addition to the loss of chlorine involved, the fire clay vessel or silica vessel in which the reaction takes place is itself rapidly destroyed in the process and one of the large expenses incurred in the manufacture of aluminum chloride is that occasioned by the destruction and necessary replacement of the retorts.

I have found that if certain forms of activated carbons are employed in place of coke in practicing the process, the temperature at which the aluminum compound reacts with the chlorine to form aluminum chloride and carbon monoxide is materially lowered. At the same time, the reaction between chlorine and silica is scarcely effected, which makes it possible to manufacture aluminum chloride in silica vessels or vessels formed of materials high in silica without the attendant replacement of the retorts now necessary. While various types of activated carbon may be employed in practicing the process with a fair degree of success, I have found that the carbon described and claimed in my prior Patent No. 1,133,049 is particularly suitable for use in practicing the process. As a general proposition, those carbons which, in the process of manufacture have received an acid bath, are particularly effective whereas absorbent carbons of the type described in my prior Patent No. 1,372,971 or alkali treated carbons, are more active than the ordinary carbonaceous material, such as coke and considerably less active than the acid treated carbons.

In practicing the process, when an acid treated carbon is employed, 10 parts of commercial aluminum oxide are mixed with the carbon and treated with chlorine gas at a temperature of 525° C. producing 14 parts of aluminum chloride. At somewhat lower temperatures the reaction is slower but still works. When an aluminum compound containing silica was subjected to the same treatment aluminum chloride was produced but only traces of silicon chloride. By employing an alkali treated carbon in the process and subjecting 10 parts of commercial aluminum oxide to chlorine gas at a temperature of 525° C., 2 parts of aluminum chloride are formed whereas at this comparatively low temperature if the process is performed with coke or other similar carbon, only 0.2 parts of aluminum chloride are obtained.

The activated carbon serves as a catalyzer in the reaction between aluminum and chlorine and further is an active chemical agent in the formation of carbon monoxide with the released oxygen. As stated, the acid treated active carbon is best suited for the purpose, but other activated carbon, both acid or alkali treated, gives better results than are obtained with the ordinary forms of carbon, such as coke.

While I have described in detail the preferred practice of my process, it is to be understood that the details of procedure may be widely varied without departing from the spirit of the invention or the scope of the subjoined claims.

I claim:

1. The herein described process of making aluminum chloride which comprises treating aluminum containing materials with chlorine in the presence of an activated carbon.

2. The herein described process of making aluminum chloride which comprises treating aluminum containing materials with chlorine in the presence of an acid treated carbon.

3. The process of making aluminum chloride which comprises treating bauxite with chlorine in the presence of an activated carbon.

4. The process of making aluminum chloride which comprises treating bauxite with chlorine in the presence of an acid treated carbon.

5. The process of making aluminum chloride which comprises treating bauxite low in iron with chlorine at a temperature above 450° C., in the presence of an activated carbon.

6. The process of making aluminum chloride which comprises treating bauxite low in iron with chlorine at a temperature above 450° C., in the presence of an acid treated carbon.

In testimony whereof, I affix my signature in presence of two witnesses.

RALPH H. McKEE.

Witnesses:
MARGARET J. STONE,
GUSTAV A. BEISWENGER.